US010802203B2

(12) United States Patent
Masuda et al.

(10) Patent No.: US 10,802,203 B2
(45) Date of Patent: Oct. 13, 2020

(54) LIGHTING DEVICE AND DISPLAY DEVICE

(71) Applicant: SHARP KABUSHIKI KAISHA, Sakai, Osaka (JP)

(72) Inventors: Takeshi Masuda, Sakai (JP); Takeshi Ishida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 30 days.

(21) Appl. No.: 16/248,504

(22) Filed: Jan. 15, 2019

(65) Prior Publication Data
US 2019/0227219 A1 Jul. 25, 2019

(30) Foreign Application Priority Data
Jan. 19, 2018 (JP) ................... 2018-007045

(51) Int. Cl.
G02F 1/1333 (2006.01)
F21V 8/00 (2006.01)
G02F 1/1335 (2006.01)

(52) U.S. Cl.
CPC ......... *G02B 6/0053* (2013.01); *G02B 6/0055* (2013.01); *G02B 6/0056* (2013.01); *G02F 1/133502* (2013.01); *G02F 1/133528* (2013.01); *G02B 6/0065* (2013.01); *G02F 2001/133541* (2013.01)

(58) Field of Classification Search
CPC .. G02B 6/0053; G02B 6/0055; G02B 6/0056; G02F 1/133502; G02F 1/133528; G02F 2001/133541
See application file for complete search history.

(56) References Cited

U.S. PATENT DOCUMENTS

| 2005/0122745 | A1* | 6/2005 | Sugiura | G02B 6/0038 362/626 |
| 2006/0262569 | A1* | 11/2006 | Kim | G02F 1/133615 362/626 |
| 2007/0115407 | A1* | 5/2007 | Richard | G02F 1/133536 349/112 |
| 2007/0133094 | A1 | 6/2007 | Walton et al. | |
| 2009/0256997 | A1* | 10/2009 | Misono | G02B 5/0231 349/64 |
| 2014/0049724 | A1* | 2/2014 | You | G02F 1/133553 349/62 |
| 2014/0241007 | A1* | 8/2014 | Chen | G02B 6/0011 362/613 |
| 2015/0062493 | A1* | 3/2015 | Yoon | G02B 6/0053 349/65 |
| 2016/0313616 | A1* | 10/2016 | Arai | G02F 1/134309 |
| 2017/0059765 | A1* | 3/2017 | Oshima | G02B 6/0053 |
| 2017/0242183 | A1* | 8/2017 | Song | G02F 1/133617 |
| 2019/0004237 | A1* | 1/2019 | Kitano | B32B 7/02 |

FOREIGN PATENT DOCUMENTS

JP 2007-164193 A 6/2007

* cited by examiner

Primary Examiner — Hoan C Nguyen
(74) Attorney, Agent, or Firm — ScienBiziP, P.C.

(57) ABSTRACT

A lighting device includes a light source having a light exit surface, an optical member covering the light exit surface and applying an optical action to light exiting the light source, and a prism sheet coveting the optical member from an opposite side from the light source, and the prism sheet includes prism portions and a light reflecting portion that covers a part of a surface of the prism portions opposite from the optical member.

10 Claims, 19 Drawing Sheets

FIG.12
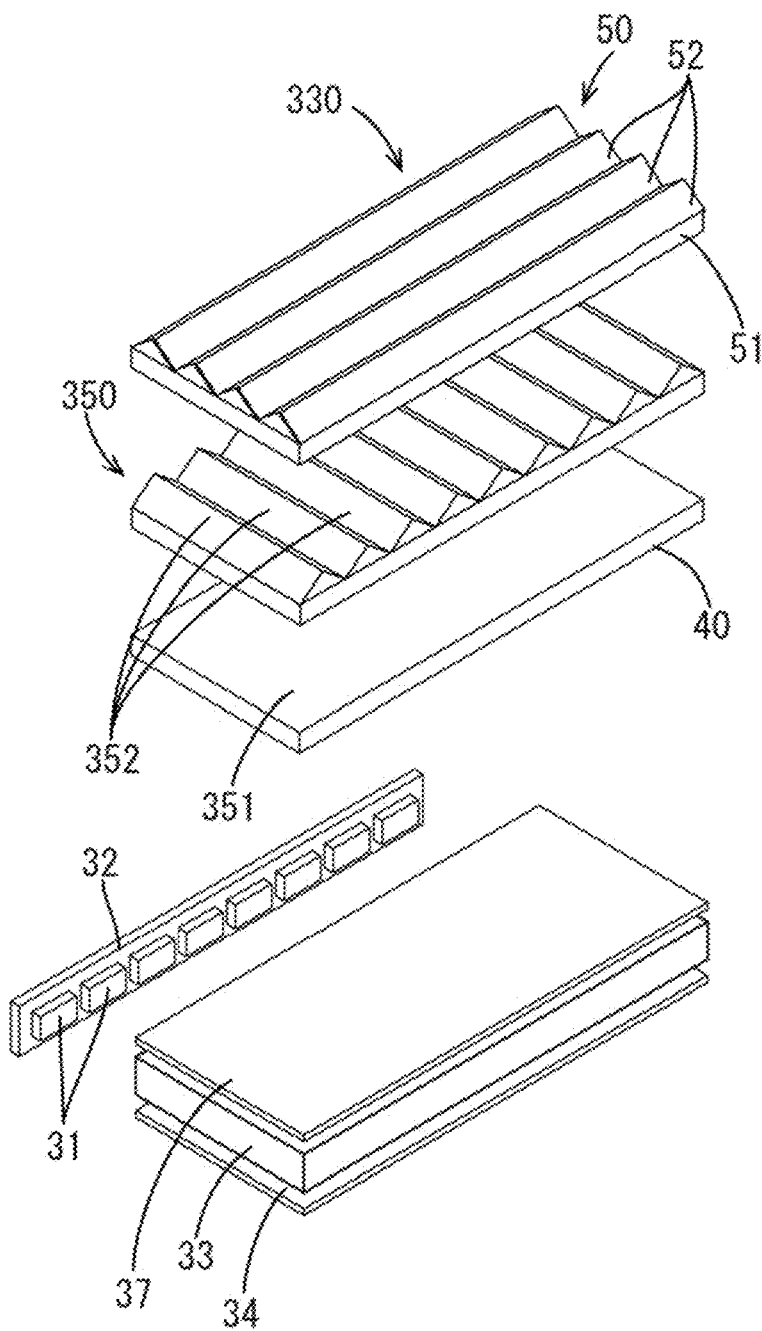
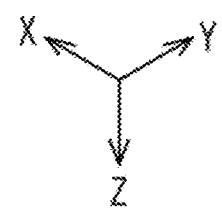

FIG.16
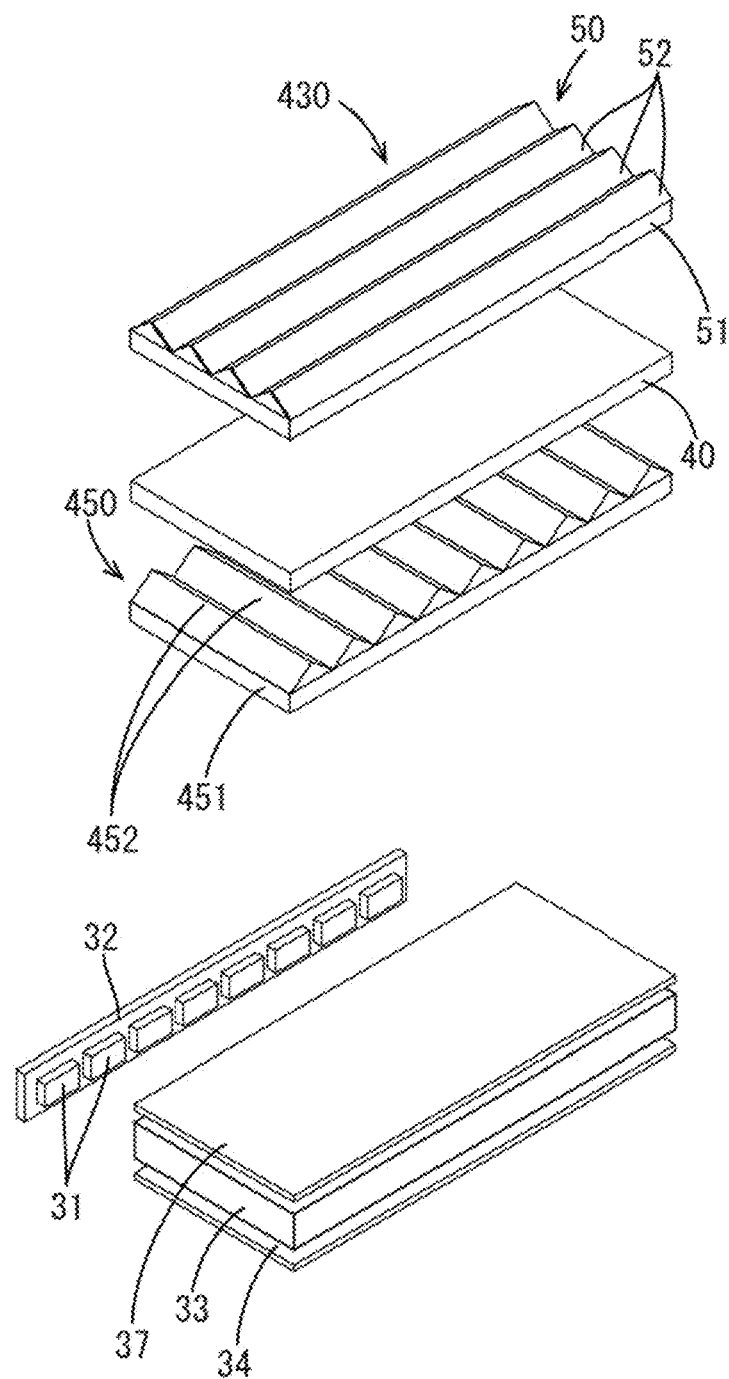
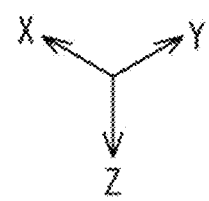

LIGHTING DEVICE AND DISPLAY DEVICE

CROSS REFERENCE TO RELATED APPLICATION

This application claims priority from Japanese Patent Application No. 2018-007045 filed on Jan. 19, 2018. The entire contents of the priority application are incorporated herein by reference.

TECHNICAL FIELD

The technology described herein relates to a lighting device and a display device.

BACKGROUND

A lighting device including an optical film has been known. The optical film includes prisms and a direction in which light rays exiting the lighting device are controlled by the prisms. By controlling the light exit direction, light is less likely to be reflected undesirably by the front glass. Such a lighting device is described in Japanese Unexamined Patent Application Publication. No. 2007-164193.

A lighting device may include the optical film and another optical member that is disposed on the optical film. In such a configuration, the light that has passed through the optical film may be reflected by the other optical member toward the optical film and the reflected light may be reflected by the optical film again and exit the lighting device. The exiting direction of such light is not restricted and may exit in other direction than the desired exit direction.

SUMMARY

The technology described herein was made in view of the above circumstances. An object is to surely control a light exit direction of light exiting a lighting device.

To solve the above problems, a lighting device of the present technology includes a light source having a light exit surface, an optical member covering the light exit surface and applying an optical action to light exiting the light source, and a prism sheet covering the optical member from an opposite side from the light source, and the prism sheet includes prism portions and a light reflecting portion that covers a part of a surface of the prism portions opposite from the optical member.

According to such a configuration, the light exiting the light source through the light exit surface passes through the optical member and travels toward the prism sheet. The prism sheet including the light reflecting portion reflects the light that travels toward the light reflecting portion. Accordingly, the light rays are less likely to exit the prism portions in a direction toward the light reflecting portion (in a first direction). If the light source, the prism sheet, and the optical member are stacked in this order, the light reflected by the optical member toward the prism sheet is reflected by the light reflecting portion of the prism portions toward the optical member. As a result, the light may exit the prism sheet in the first direction. According to the above configuration, the light source, the optical member, and the prism sheet are stacked in this order. According to such a configuration, the light exiting the light source is less likely to be reflected by the optical member toward the prism sheet. As a result, the light exit direction of the light exiting the lighting device is surely controlled.

According to the technology described herein, the exit direction of light exiting the lighting device is surely controlled.

BRIEF DESCRIPTION OF THE DRAWINGS

FIG. 12 is an exploded perspective view illustrating a general configuration of a backlight device according to a third embodiment.

FIG. 16 is an exploded perspective view illustrating a general configuration of a backlight device according to a fourth embodiment.

DETAILED DESCRIPTION

First Embodiment

Figure 1:
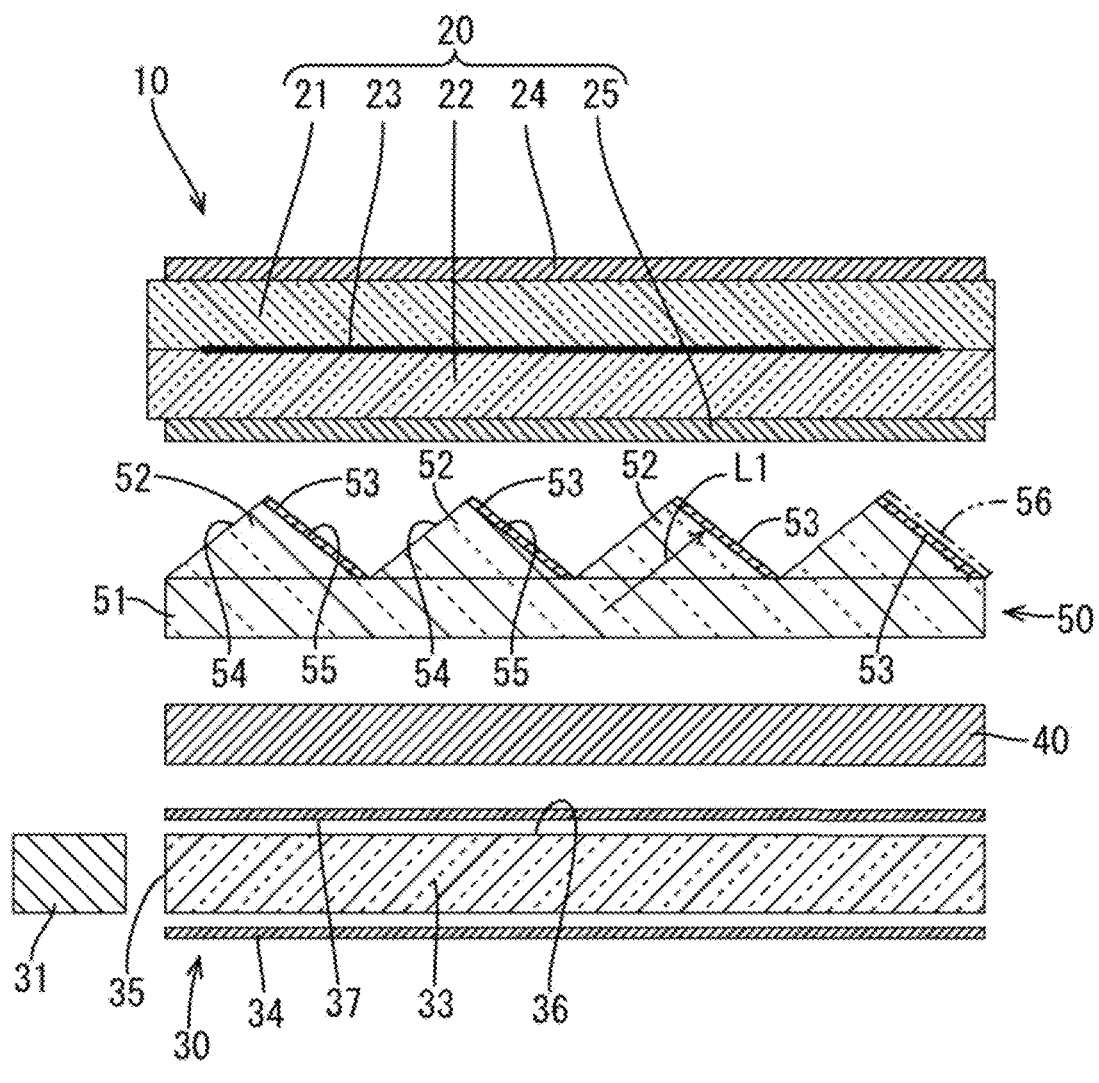
FIG. 1 is a cross-sectional view illustrating a general configuration of a liquid crystal display device according to a first embodiment of the present technology.

A first embodiment of the present technology will be described with reference to FIGS. 1 to 8. In the present embodiment, a liquid crystal display device 10 will be described as an example. As illustrated in FIG. 1, the liquid crystal display device 10 has a rectangular plan-view shape as a whole, and includes a liquid crystal panel 20 (a display panel) and a backlight device 30 (a lighting device). The backlight device 30 is arranged on a rear side of the liquid crystal panel 20 (on a lower side in FIG. 1) and provides light to the liquid crystal panel 20. The liquid crystal panel 20 has a rectangular plan view shape and displays images thereon with using light from the backlight device 30. The liquid crystal panel 20 includes a pair of substrates 21, 22 and a liquid crystal layer 23 interposed between the substrates 21, 22. The substrates 21, 22 are made of glass that has transmissivity. The liquid crystal layer 23 includes liquid crystal molecules having optical characteristics that change according to application of the electric field.

Among the substrates 21, 22 that are opposite each other, a front-side one is a CF substrate 21 and a back-side one is an array substrate 22. TFTs (thin film transistors), which are switching components, and pixel electrodes are disposed on an inner surface side of the array substrate 22. Gate lines and source lines are routed in a matrix near the TFTs and the pixel electrodes. The gate lines and the source lines receive certain image signals from a control circuit (not illustrated). On the CF substrate 21, color filters are arranged to overlap each of the pixel electrodes. The color filters includes red (R), green (G), and blue (B) color portions that are arranged alternately. A common electrode is arranged on an inner surface of the color filters and opposite the pixel electrodes on the array substrate 22 side. The common electrode may be arranged on the array substrate 22. Alignment films are disposed on the inner surface side of the substrates 21, 22 to align the liquid crystal molecules included in the liquid crystal layer. Polarizing plates 24, 25 are attached to the outer surfaces of the substrates 21, 22. The polarizing plate 25 that is closer to the backlight device 30 is disposed to cover the array substrate 22 (one of the substrates arranged on the lighting device side) from the backlight device 30 side. The polarizing plate 25 is, for example, a circular polarizing plate. The circular polarizing plate includes a linear polarizing plate and a λ/4 retarder.

Figure 2:
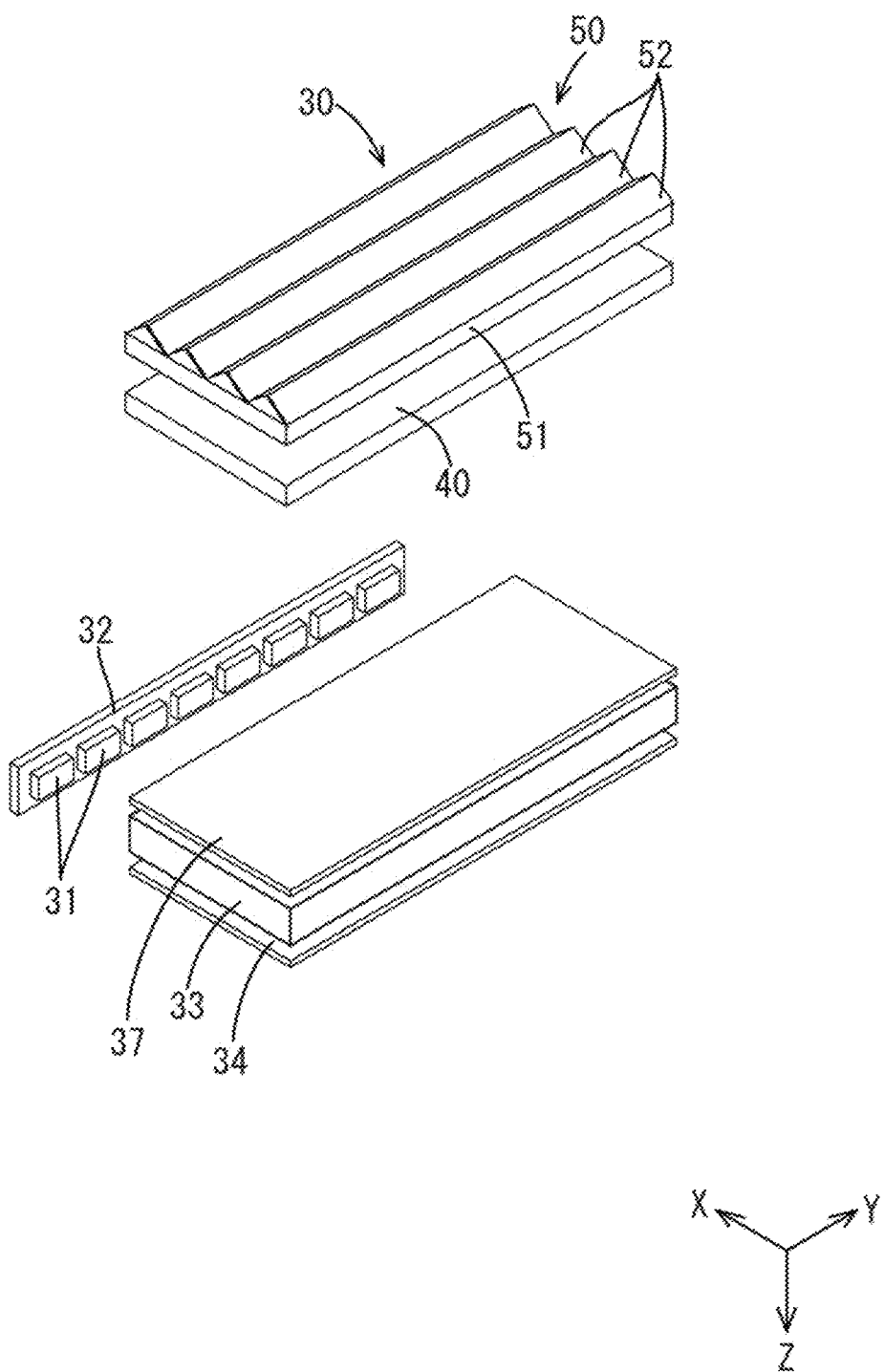
FIG. 2 is an exploded perspective view illustrating a general configuration of a backlight device included in the liquid crystal display device.
Figure 3:
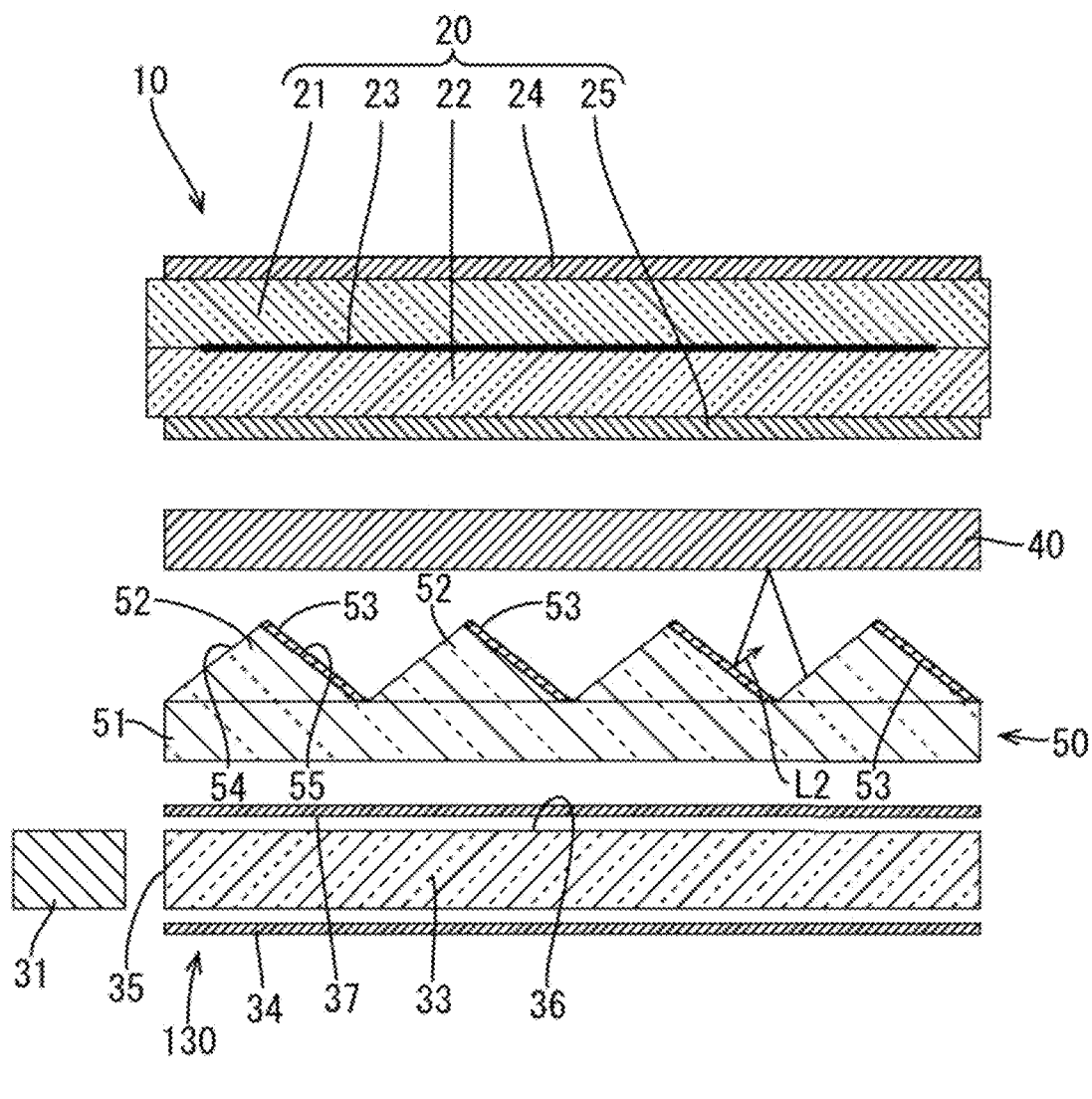
FIG. 3 is a cross-sectional view illustrating a general configuration of a liquid crystal display device of Comparative Example.

As illustrated in FIG. 2, the backlight device 30 has a plan-view rectangular block shape as a whole. The backlight device 30 includes LEDs 31 (light emitting diodes) that are point light sources, an LED board 32 where the LEDs 31 are mounted, a light guide plate 33 that guides light from the LEDs 31, a light reflection sheet 34 that reflects light from the light guide plate 33, a light diffuser sheet 37, a reflection type polarizing plate 40, and a prism sheet 50 (a light collection sheet). The backlight device 30 includes the LEDs 31 on a long-side edge portion of an outer peripheral portion thereof and light enters through one side surface. The backlight device 30 is an edge-light type (a side-light type). The LED board 32 is a plate member extending in the Y-axis direction (a long-side direction of the light guide plate 33). The LEDs 31 are configured by enclosing LED chips with resin material on a base board that is fixed on the LED board 32. The LEDs 31 are arranged in a line along a longitudinal dimension of the LED board 32 (the Y-axis dimension) at predetermined intervals.

The light guide plate 33 is made of synthetic resin that has refractive index greater than air and high transmissivity and is substantially transparent (acrylic resin such as PMMA). As illustrated in FIG. 2, the light guide plate 33 has a substantially rectangular plan-view plate shape. On the light guide plate 33, a short-side direction matches the X-axis direction, a long-side direction matches the Y-axis direction, and a plate thickness direction that is perpendicular to the plate surface matches the Z-axis direction. Among edge surfaces of the light guide plate 33, one long-side edge surface (a light entrance surface 35) is opposite the LEDs 31. A front-side plate surface of the light guide plate 33 is a light exit surface 36 through which light within the light guide plate 33 exits toward the liquid crystal panel 20 (refer FIG. 1). Light emitted by the LEDs 31 enters the light guide plate 33 through the light entrance surface 35 and travels within the light guide plate 33 and exits through the light exit surface 36. Namely, the LEDs 31 and the light guide plate 33 configure a planar light source (a light source) having the light exit surface 36. A light reflection sheet 34 is disposed to cover a back-side plate surface of the light guide plate 33. Light that exits the light guide plate 33 through the back-side plate surface is reflected by the light reflection sheet 34 toward the front side.

The light diffuser sheet 37 is disposed to cover the light exit surface 36 and diffuses the light exiting through the light exit surface 36. The reflection type polarizing plate 40 is disposed to cover the light diffuser sheet 37 from the front side (the liquid crystal panel 20 side). The reflection type polarizing plate 40 has a multilayer structure including layers having different refraction indexes that are layered alternately. Only linearly polarized light having a specific direction of the oscillation transmits through the reflection type polarizing plate 40 and linearly polarized light having a direction of the oscillation perpendicular to the specific direction is reflected by the reflection type polarizing plate 40. While the polarized light that is reflected by the reflection type polarizing plate 40 toward the light guide plate 33 is reflected by the light reflection sheet 34 again and enters the reflection type polarizing plate 40, the light is depolarized and a part of the light rays entering the reflection type polarizing plate 40 passes therethrough. In this embodiment, the polarizing plate 25 is configured to transmit the linearly polarized light that has passed through the reflection type polarizing plate 40. The linearly polarized light that is to be absorbed by the polarizing plate 25 of the liquid crystal panel 20 without having the reflection type polarizing plate 40 is reflected by the reflection type polarizing plate 40 toward the light guide plate 33 and reused. Therefore, light use efficiency (eventually brightness) is improved. One example of such a reflection type polarizing plate 40 is "DBEF (registered trademark)" made by SUMITOMO 3M. The reflection type polarizing plate 40 is not limited to the above described one but may be another one as long as it is configured to reflect a part of light rays exiting through the light exit surface 36 toward the light guide plate 33 to reuse it. The reflection type polarizing plate 40 is one example of the optical member that applies an optical action to the light exiting the light guide plate 33.

The prism sheet 50 is disposed to cover the reflection type polarizing plate 40 from the front side (an opposite side from the light source) and is configured to collect light exiting through the light exit surface 36 with respect to the X-axis direction to improve front brightness. As illustrated in FIG. 1, the prism sheet 50 includes a sheet base member 51 of a sheet member, prism portions 52 (unit light collecting portions), and a light reflecting portion 53. The prism portions 52 are included on the front side of the sheet base member 51. The light reflecting portion 53 covers a part of a surface of the prism portion 52 that is on an opposite side from the reflection type polarizing plate 40. The sheet base member 51 and the prism portions 52 are formed by molding transparent synthetic resin such as polycarbonate with extrusion molding and are formed integrally from the same material. The transparent synthetic resin used for the sheet base member 51 and the prism portions 52 is less likely to cause double refraction. The sheet base member 51 and the prism portions 52 may be formed of different materials. The sheet base member 51 may be formed of thermoplastic resin such as polycarbonate that is less likely to cause double refraction and the prism portions 52 may be formed of ultraviolet curing resin. If the prism sheet 50 causes double refraction, the polarization of light is disturbed, when the linearly polarized light that has passed through the reflection type polarizing plate 40 passes through the prism sheet 50. Accordingly, a part of the light rays passing through the prism sheet 50 is absorbed by the polarizing plate 25. Therefore, it is desirable to use the material that is less likely to cause double refraction for the prism sheet 50.

The prism portions 52 project from the surface of the sheet base member 51 toward the front side (the light exit side). The prism portions 52 extend linearly along the Y-axis direction and arranged in the X-axis direction. Namely, an arrangement direction of the prism portions 52 is parallel to an arrangement direction of the LEDs 31 and the light guide plate 33. Each prism portion 52 is formed in a triangular column having an isosceles triangular cross-sectional shape and has a pair of sloped surfaces 54, 55. The sloped surfaces 54, 55 are surfaces of the prism portion 52 facing the liquid crystal panel 20. The light reflecting portion 53 is disposed to cover the sloped surface 55 (one of the pair of sloped surfaces). The sloped surface 55 is farther from the LEDs 31 than the sloped surface 54 is. An apex angle of the prism portion 52 (an angle between the pair of sloped surfaces 54, 55) is 90 degrees, for example. A length of the prism portion 52 in the X-axis direction is 50 μm, for example. A thickness of the prism sheet 50 (a thickness of the sheet base member 51 and the prism portion 52) is 155 μm, for example. The values are not necessarily limited to the specific values.

The arrangement direction of the prism portions 52 matches a polarization axis of the linearly polarized light that passes through the reflection type polarizing plate 40. The arrangement direction of the prism portions 52 may be perpendicular to the polarization axis of the linearly polarized light that passes through the reflection type polarizing plate 40. The light reflecting portion 53 is formed by disposing aluminum having good light reflectivity on the sloped surface 55 with the oblique vapor deposition. The material of the light reflecting portion 53 is not limited to aluminum. A protection layer 56 (illustrated with two dot chain line in FIG. 1) made of $SiO_2$ may be provided to cover the light reflecting portion 53.

Next, advantageous effects of the present embodiment will be described. In the present embodiment, the light exiting the light guide plate 33 through the light exit surface 36 passes through the reflection type polarizing plate 40 and travels toward the prism sheet 50. The prism sheet 50 including the light reflecting portions 53 reflects the light that travels within the prism portion 52 toward the light reflecting portion on 53 (for example, illustrated with an arrow L1 in FIG. 1). Accordingly, the light rays are less likely to exit the prism portion 52 in a direction toward the light reflecting portion 53 (in a first direction). In a backlight device 130 of Comparative Example illustrated in FIG. 3, the light guide plate 33, the prism sheet 50, and the reflection type polarizing plate 40 are stacked in this order. In such a configuration, the light reflected by the reflection type polarizing plate 40 toward the prism sheet 50 is reflected by the light reflecting portion 53 of the prism portion 52 toward the reflection type polarizing plate 40. As a result, the light may exit the prism sheet 50 in the first direction (illustrated with an arrow L2 in FIG. 3). According to the present embodiment, the light guide plate 33, the reflection type polarizing plate 40, and the prism sheet 50 are stacked in this order. According to such a configuration, the light exiting the light guide plate 33 is less likely to be reflected by the reflection type polarizing plate 40 toward the prism sheet 50. As a result, the light exit direction of the light exiting the backlight device 30 is surely controlled.

Figure 4:
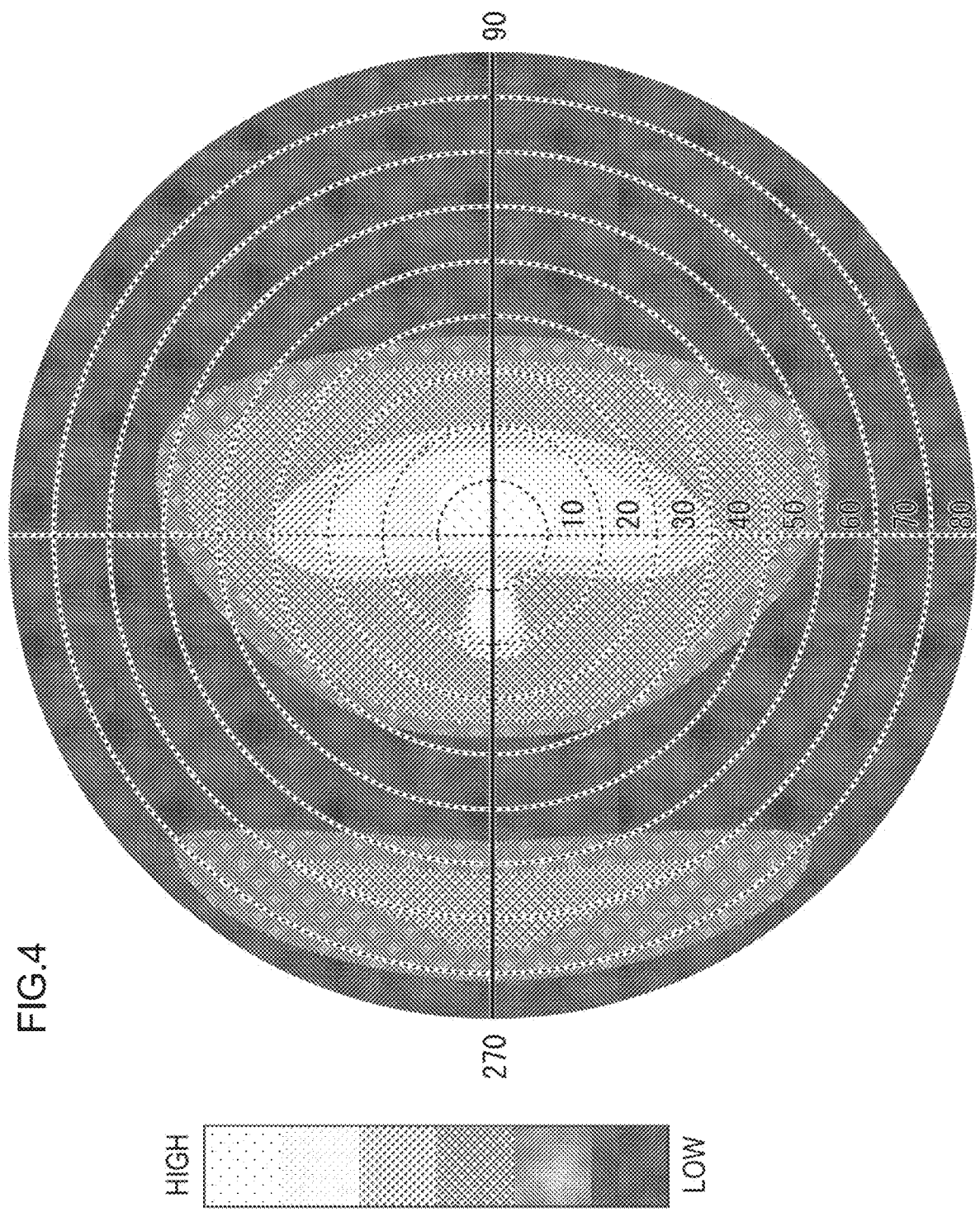
FIG. 4 is a diagram illustrating a brightness angle distribution according to the first embodiment.
Figure 5:
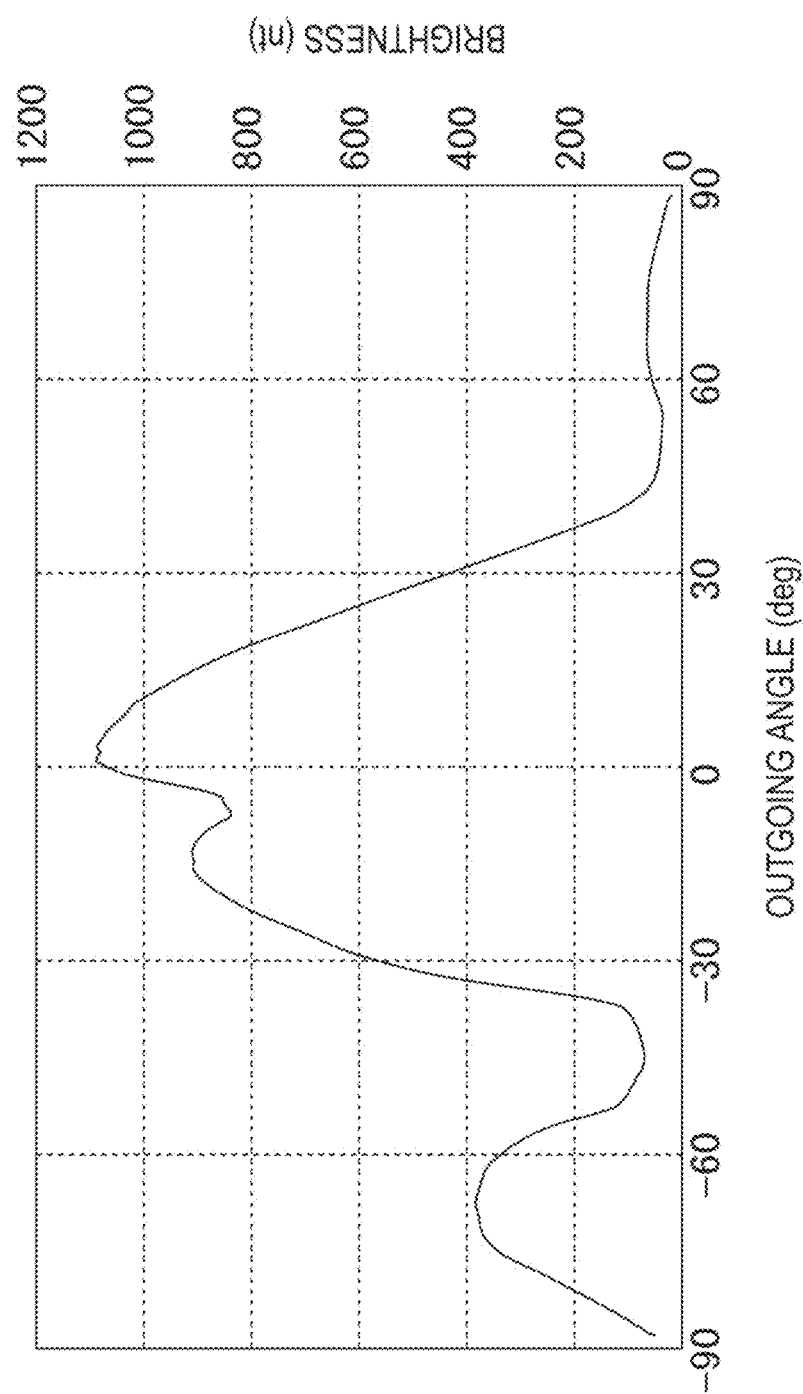
FIG. 5 is a graph illustrating a brightness angle distribution according to the first embodiment.
Figure 6:
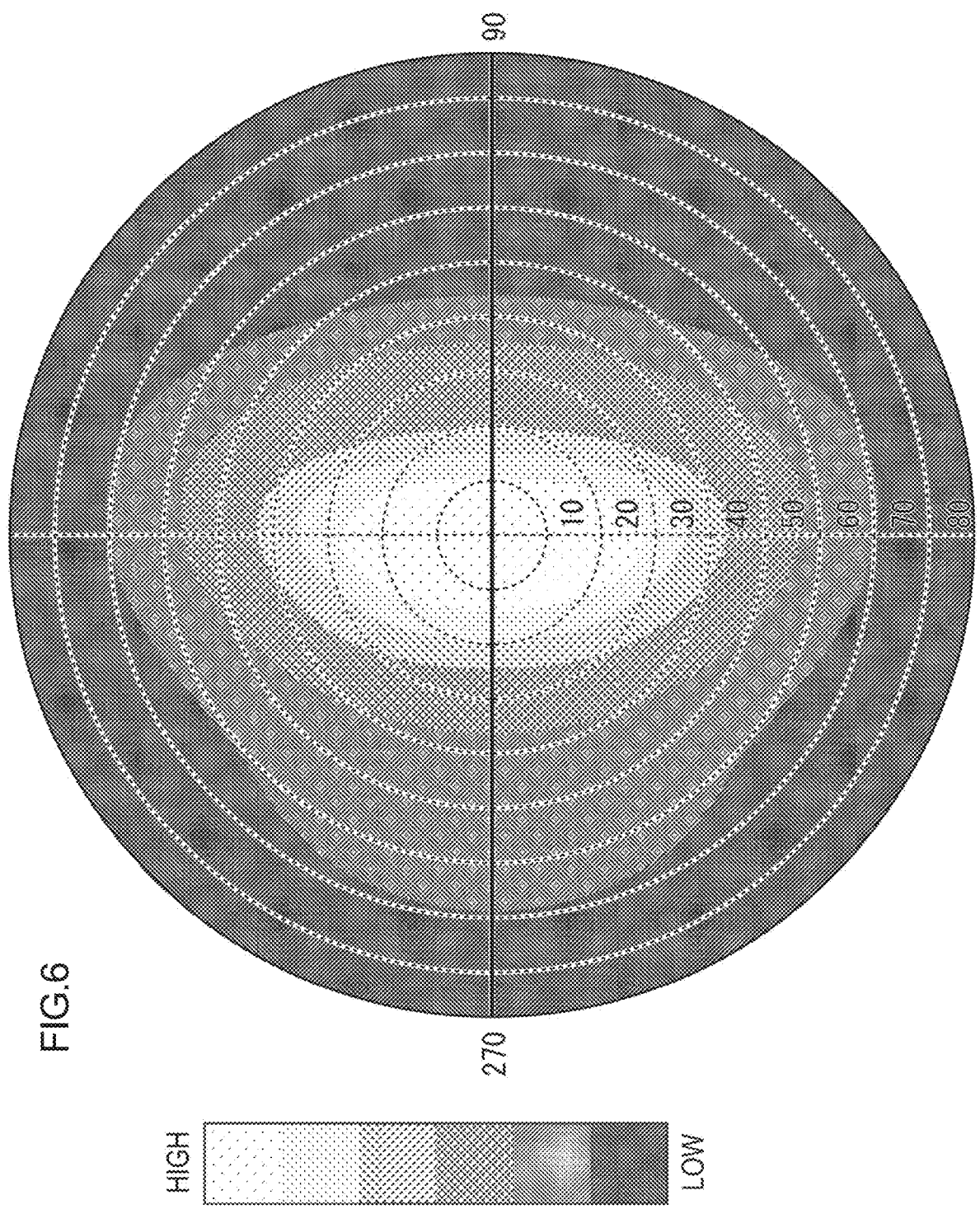
FIG. 6 is a diagram illustrating a brightness angle distribution according to Comparative Example.

Measurement results of brightness of light rays exiting the backlight device according to the present embodiment and Comparative Example (the configuration of FIG. 3) are illustrated in FIGS. 4 to 7. FIGS. 4 and 6 are diagrams illustrating brightness angle distributions of exiting light rays with respect to a front direction (the Z-axis direction, a direction in which the backlight device is seen from the front side). FIG. 4 is a diagram illustrating a brightness angle distribution according to the present embodiment and FIG. 6 is a diagram illustrating a brightness angle distribution according to Comparative Example. In FIGS. 4 and 6, a lateral axis represents outgoing angles with respect to the X-axis direction (angles of an outgoing direction in the X-axis direction with respect to the front direction) and a vertical axis represents outgoing angles with respect to the Y-axis direction (angles of an outgoing direction in the Y-axis direction with respect to the front direction). In each of FIGS. 4 and 6, a left side is closer to the LEDs 31 and a right side is farther from the LEDs 31. In FIGS. 4 and 6, a level of brightness is represented by a density of hatching. The brightness is higher as the hatching density is lower (a bright portion), the brightness is lower as the hatching density is higher (a dark portion). Also in FIGS. 13 and 17, which will be described later, the brightness is higher as the hatching density is lower (a bright portion), the brightness is lower as the hatching density is higher (a dark portion).

Figure 7:
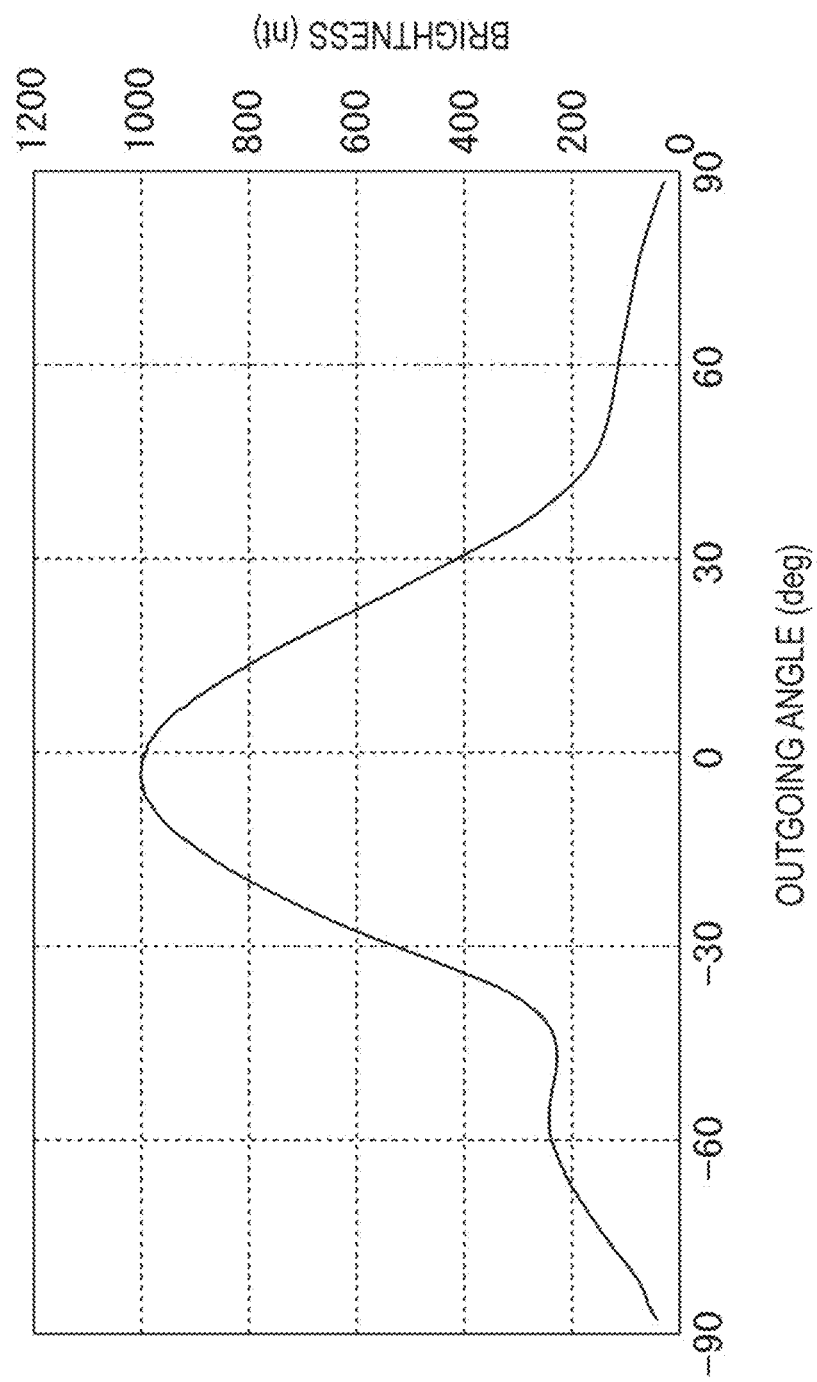
FIG. 7 is a graph illustrating a brightness angle distribution according to Comparative Example.

FIGS. 5 and 7 are graphs illustrating relation between the outgoing angles (the lateral axis) and the brightness (the vertical axis) with respect to the X-axis direction. FIG. 5 illustrates brightness of the present embodiment and FIG. 7 illustrates brightness of Comparative Example. In each of FIGS. 5 and 7, a left side is closer to the LEDs 31 and a right side is farther from the LEDs 31. As illustrated in FIGS. 4 to 7, in the present embodiment, compared to Comparative Example, the brightness of light rays exiting the prism portion 52 in a direction toward the light reflecting portion 53 (the right side) is lower (refer the range of the outgoing angles from 30° to 90° in FIGS. 5 and 7) and the brightness of light rays exiting the prism portion 52 in a direction toward the portion without having the light reflecting portion 53 (the left side) is higher (refer the range of the outgoing angles from −60° to −90° in FIGS. 5 and 7). In the present embodiment, the exit direction of light rays is surely controlled by the light reflecting portions 53.

The optical member disposed between the prism sheet 50 and the light guide plate 33 is the reflection type polarizing plate 40. The reflection type polarizing plate 40 is configured to reflect specific polarized light. Therefore, in a configuration including the light guide plate 33, the prism sheet 50, and the reflection type polarizing plate 40 stacked in this order, the amount of light rays reflected toward the prism sheet 50 is increased compared to that of other optical members and the amount of light rays travelling within the prism portion 52 toward the light reflecting portion 53 (the right side) is likely to be increased. Therefore, the configuration of the present embodiment including the reflection type polarizing plate 40 as the optical member is particularly preferable.

The arrangement direction of the prism portions 52 matches the polarization axis of the linearly polarized light passing through the reflection type polarizing plate 40. In the present embodiment, the linearly polarized light passing through the reflection type polarizing plate 40 travels toward the prism portions 52. Since the arrangement direction of the prism portions 52 matches the polarizing axis of the linearly polarized light, the light rays directed from the reflection type polarizing plate 40 toward the prism portion 52 is P-polarized with respect to the light entrance surface of the prism portion 52 (and the light reflecting portion 53). If the light is refracted or reflected by the prism portion 52 (and reflected by the light reflecting portion 53), the polarization state of light is less likely to be changed. In using the backlight device 30 for lighting the liquid crystal panel 20, if the polarization state of light that has transmitted through the reflection type polarizing plate 40 is changed, the amount of light rays transmitting through the polarizing plate 25 of the liquid crystal panel 20 is decreased and light use efficiency is lowered. In the present embodiment, the linearly polarized light that has passed through the reflection type polarizing plate 40 exits the backlight device 30 while keeping the polarization state of the linearly polarized light and therefore, the light use efficiency is further improved. In this section, the change of the polarization state of light means rotation of the polarization axis or phase difference caused by the double refraction.

The arrangement direction of the prism portions 52 may be perpendicular to the polarization axis of the linearly polarized light passing through the reflection type polarizing plate 40. Since the arrangement direction of the prism portions 52 is perpendicular to the polarizing axis of the linearly polarized light, the light rays directed from the reflection type polarizing plate 40 toward the prism portion 52 is S-polarized with respect to the light entrance surface of the prism portion 52 (and the light reflecting portion 53). If the light is refracted or reflected by the prism portion 52 (and reflected by the light reflecting portion 53), the polarization state of light is less likely to be changed. Accordingly, the linearly polarized light that has passed through the reflection type polarizing plate 40 exits the backlight device 30 while keeping the polarization state of the linearly polarized light and therefore, the light use efficiency is further improved.

Figure 8:
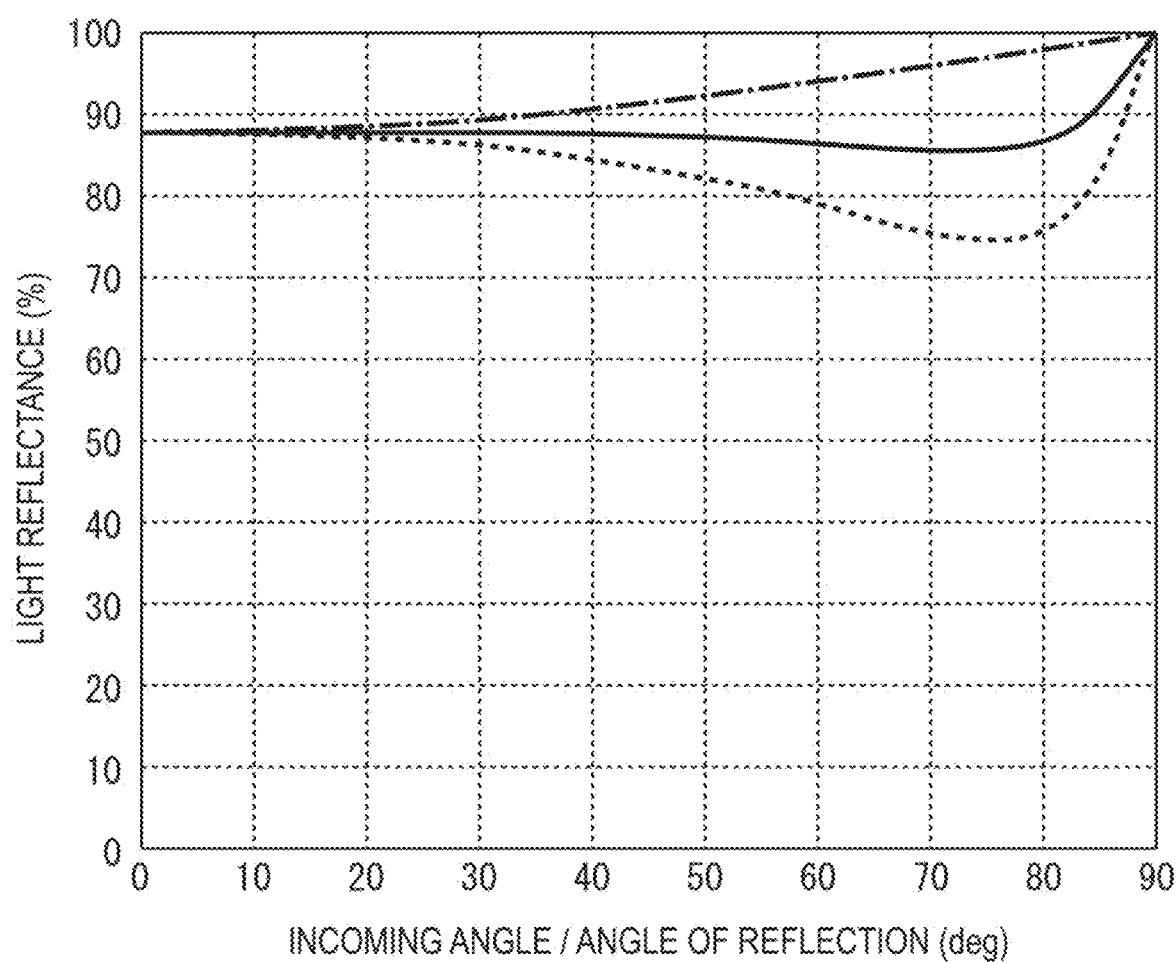
FIG. 8 is a graph illustrating a relation of incoming angles and light reflectance when light is incident on aluminum.

FIG. 8 is a graph illustrating a relation of incoming angles and light reflectance when light is incident on aluminum. In FIG. 8, a broken line represents light reflectance of P-polarized light, a dashed line represents light reflectance of S-polarized light, and a solid line represents average values of light reflectance of S-polarized light and P-polarized light. As illustrated in FIG. 8, the light reflectance of S-polarized light with respect to metal is generally higher than that of P-polarized light with respect to metal. Therefore, in using metal as the light reflecting portion 53, it is preferable that the arrangement direction of the prism portions 52 is perpendicular to the polarizing axis of the linearly polarized light passing through the reflection type polarizing plate 40. According to such a configuration, the linearly polarized light passing through the reflection type polarizing plate 40 is S-polarized (polarized vertically to the light entrance surface) with respect to the light reflecting portion 53 and the amount of light rays reflected by the light reflecting portion 53 is increased (namely, the amount of light rays absorbed by the light reflecting portion 53 is decreased). Therefore, the light use efficiency is improved.

Each prism portion 52 is formed in a triangular column and one sloped surface 55 of the pair of sloped surfaces 54, 55 is covered with the light reflecting portion 53. According to such a configuration, the light is less likely to exit through the sloped surface 55 and the amount of light rays exiting through the sloped surface 54 is increased.

The arrangement direction of the prism portions 52 is along the arrangement direction of the LEDs 31 and the light guide plate 33 (the X-axis direction) and the sloped surface 55 covered with the light reflecting portion 53 is farther from the LEDs 31 among the sloped surfaces 54, 55. The light emitted by the LEDs 31 travels within the light guide plate 33 and exits through the light exit surface 36. Since the sloped surface 55 that is one of the two sloped surfaces of the prism portion 52 farther from the LEDs 31 is covered with the light reflecting portion 53, among the light rays exiting the light guide plate 33 through the light exit surface 36, the light rays directed in a direction farther away from the LEDs 31 can be controlled.

The liquid crystal panel 20 includes a pair of substrates 21, 22 opposed to each other, the liquid crystal layer 23 disposed between the substrates 21, 22, and the polarizing plate 25 covering the substrate 22 on the backlight device 30 side from the backlight device 30 side. The light entering the liquid crystal panel 20 reflects within the liquid crystal panel 20 and is reflected toward the prism sheet 50. The reflected light may be reflected by the light reflecting portion 53 of the prism portion 52 toward the liquid crystal panel 20 and may exit in the direction (the first direction) that is an undesired light exit direction and is to be restricted by the light reflecting portion 53. Since the liquid crystal panel 20 includes the polarizing plate 25 that is a circular polarizing plate, the light entering the liquid crystal panel 20 is less likely to be reflected toward the backlight device 30. Therefore, the light is less likely to exit in the undesired light exit direction as described before. The polarizing plate 25 that is the circular polarizing plate is configured by stacking the linear polarizing plate and the $\lambda/4$ retarder in this order from the backlight device 30 side. According to such a configuration, the light exiting the backlight device 30 passes through the linear polarizing plate and turns to be linearly polarized light when entering the liquid crystal panel 20 and subsequently passes through the $\lambda/4$ retarder and turns to be circular polarized light. If such circular polarized light is reflected within the liquid crystal panel 20, the reflected light turns to be circular polarized light having a rotation direction opposite from that of the incident light. The reflected light passes through the $\lambda/4$ retarder again and turns to be linearly polarized light that is perpendicular to the incident light and is absorbed by the linear polarizing plate. Therefore, the light that has entered the liquid crystal panel 20 is less likely to be reflected toward the backlight device 30. However, the polarizing plate 25 is not necessarily a circular polarizing plate. In this embodiment, the reflection type polarizing plate 40 and the prism sheet 50 are stacked. However, the reflection type polarizing plate 40 and the prism sheet 50 may be bonded to each other with an adhesive (bonding) member. Furthermore, the prism portions 52 made of ultraviolet curing resin may be directly arranged on the reflection type polarizing plate 40.

Second Embodiment

Figure 9:
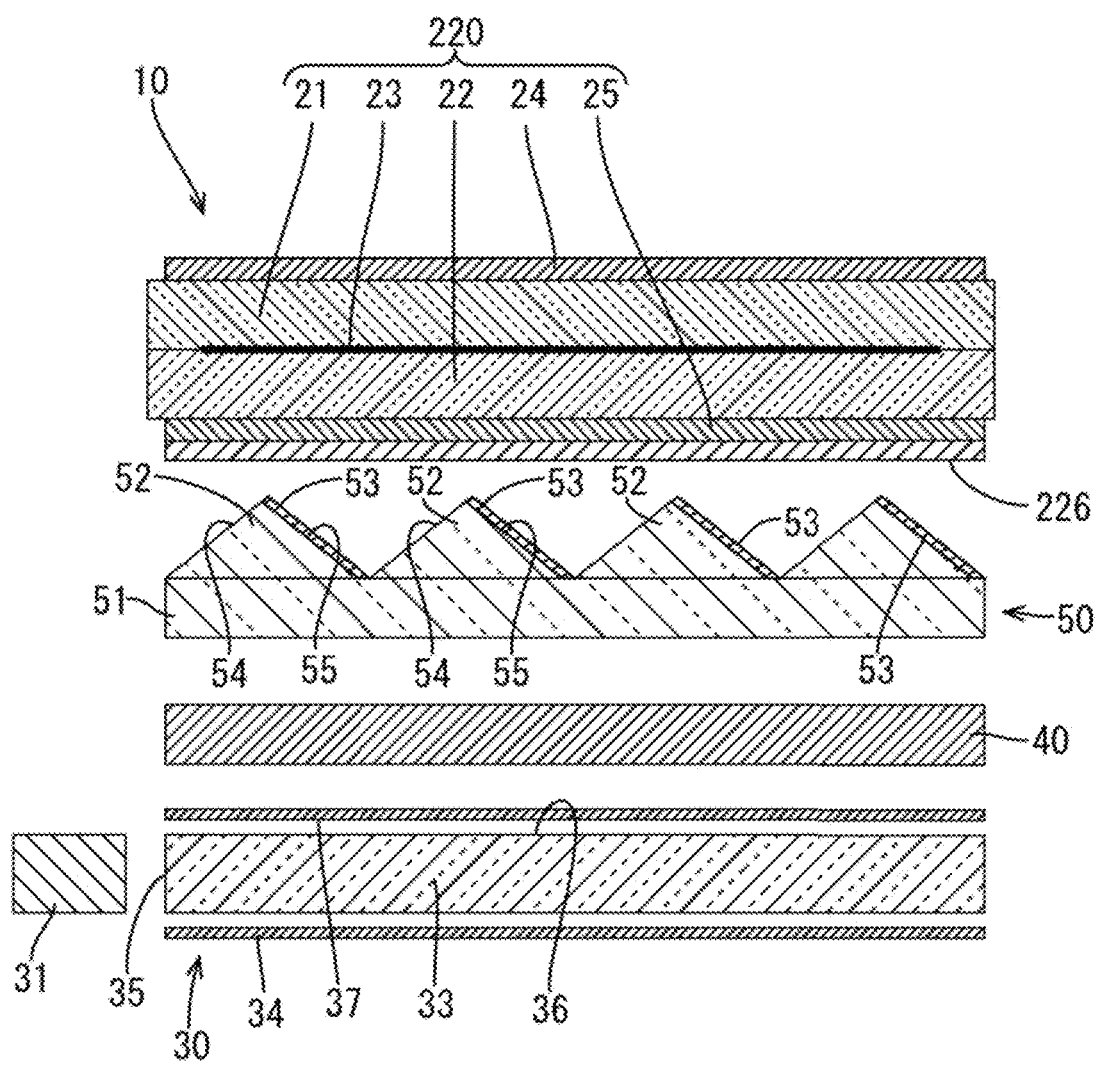
FIG. 9 is a cross-sectional view illustrating a general configuration of a liquid crystal display device according to a second embodiment.
Figure 10:
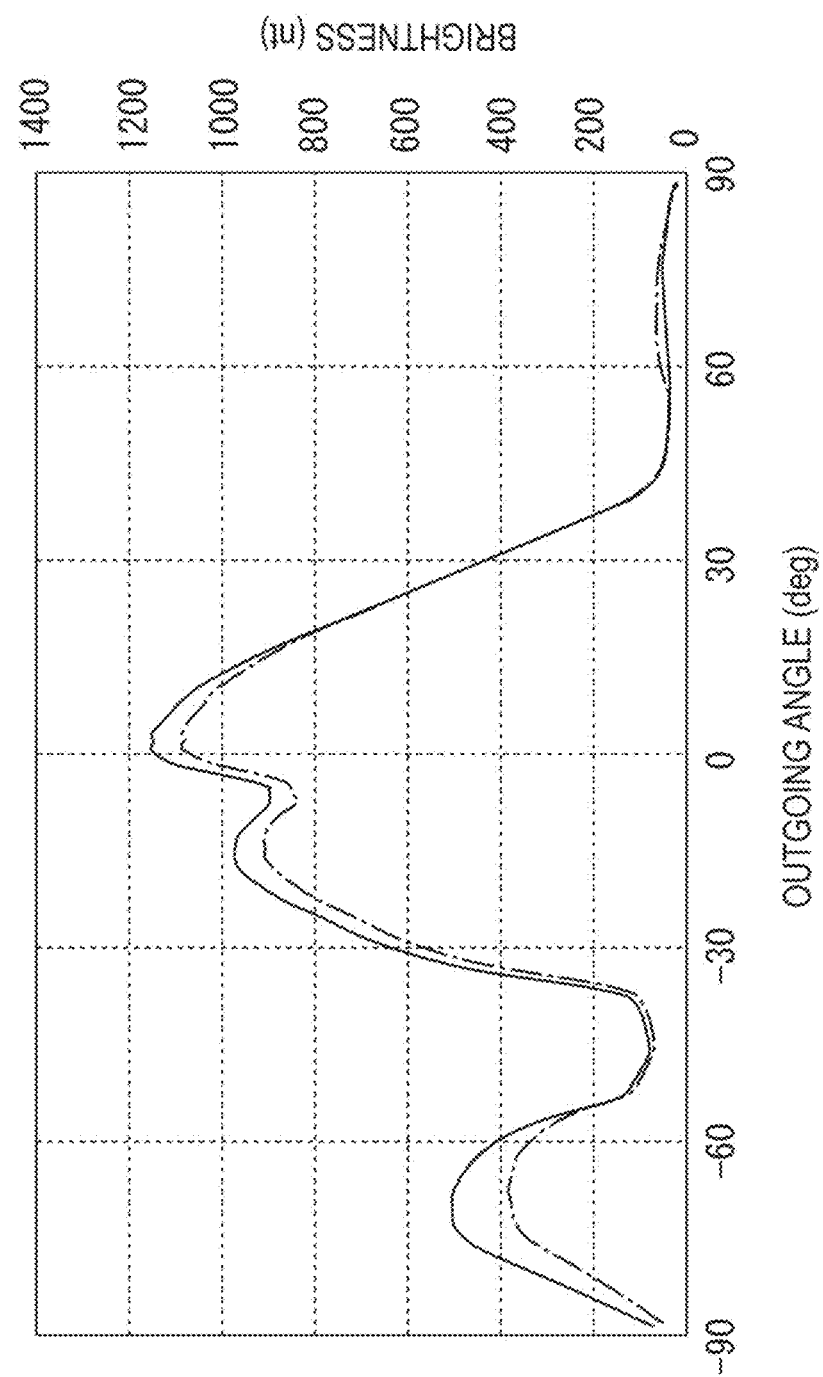
FIG. 10 is a graph illustrating a brightness angle distribution according to the second embodiment.
Figure 11:
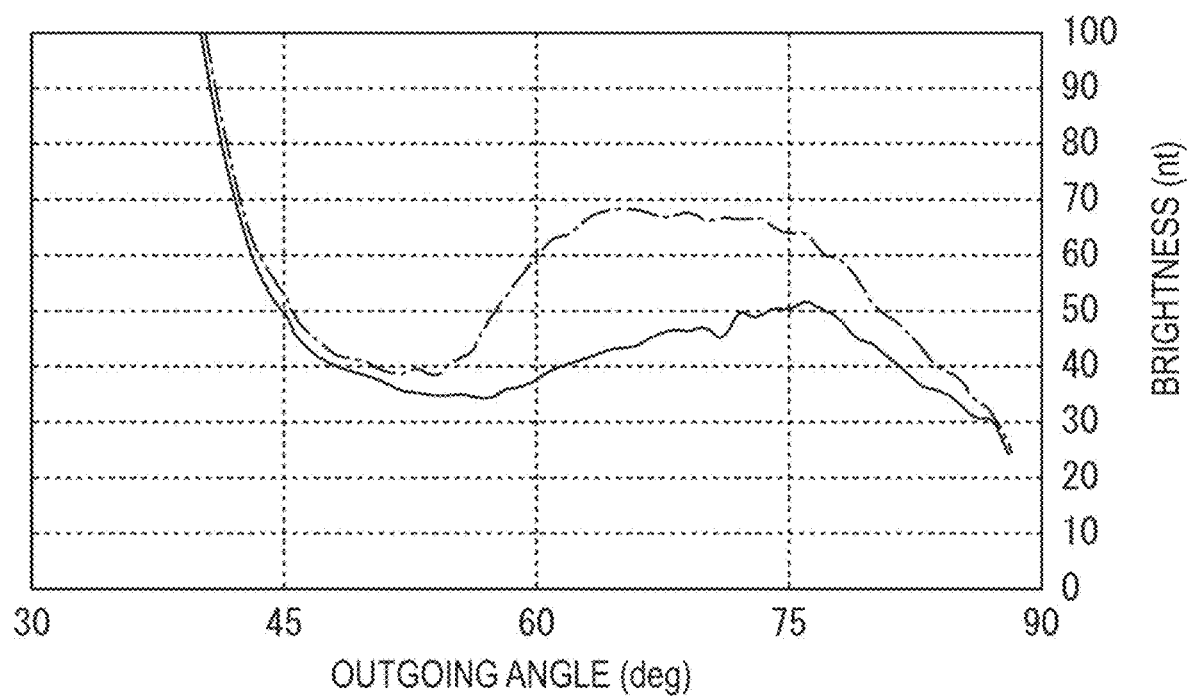
FIG. 11 is a graph illustrating a part of the graph in FIG. 10.

Next, a second embodiment of the present technology will be described with reference to FIGS. 9 to 11. Same components as those of the above embodiment are provided with same symbols and will not be described. A liquid crystal panel 220 of this embodiment includes an anti-reflection layer 226 on a surface thereof opposite the backlight device 30 (a back surface of the polarizing plate 25). An AR coating layer may be used as the anti-reflection layer 226. Specifically, the AR coating layer may be a thin film made of low refractive index material such as magnesium fluoride. The AR coating layer has a film thickness of a ¼ wavelength of visible light such that the reflection light reflecting off the surface of the AR coating layer and the light passing through the AR coating layer and reflecting off an adjacent component are in reversed phases while being displaced with a ½ wavelength. Therefore, the reflection light rays in the reversed phases cancel each other such that the amount of reflection light rays is reduced.

In the present embodiment, if the light reflected by the surface of the liquid crystal panel 220 opposite the backlight device 30 toward the prism sheet 50 is reflected by the light reflecting portion 53 of the prism portion 52 toward the liquid crystal panel 20, the light may exit the backlight device 30 in the undesired light exit direction (the first direction) in which the light exiting is to be controlled by the light reflecting portion 53. Such undesired light exiting is less likely to be caused by disposing the anti-reflection layer 226 on the surface of the liquid crystal panel 220 opposite the backlight device 30. FIG. 10 is a graph illustrating relation between the outgoing angles (the lateral axis) and the brightness (the vertical axis) with respect to the X-axis direction. FIG. 11 is a graph illustrating the range of the outgoing angles from 30° to 90° in the graph of FIG. 10. In FIGS. 10 and 11, solid lines illustrate brightness of the second embodiment and dashed lines illustrate brightness of the first embodiment. As illustrated in FIGS. 10 and 11, in the present embodiment, compared to the first embodiment, the brightness of light rays exiting the prism portion 52 in a direction toward the light reflecting portion 53 (the right side) is lower (refer the range of the outgoing angles from 45° to 90° in FIG. 11). Accordingly, in the present embodiment including the anti-reflection layer 226, the exit direction of light rays is surely restricted by the light reflecting portion 53.

Furthermore, the present embodiment may include an anti-glare layer instead of the anti-reflection layer 226. The anti-glare layer has minute unevenness on a surface thereof to scatter the reflection light. According to such an anti-glare layer, the reflection light reflected by the light reflecting portion 53 toward the liquid crystal panel 220 is less likely to be directed in a specific direction. Therefore, the light is less likely to exit the backlight device 30 in the undesired light exit direction (the first direction) in which the light exiting is to be restricted by the light reflecting portion 53. The anti-reflection layer 226 and the anti-glare layer may stacked on the surface of the liquid crystal panel 220 opposite the backlight device 30. The anti-reflection layer or the anti-glare layer may be disposed on the back surface of the polarizing plate 25 of the liquid crystal panel 220 (the surface opposite the backlight device 30) or the anti-reflection layer and the anti-glare layer may be disposed on the back surface of the polarizing plate 25 of the liquid crystal panel 220 (the surface opposite the backlight device 30).

Third Embodiment

Next, a third embodiment of the present technology will be described with reference to FIGS. 12 to 15. Same components as those of the above embodiments are provided with same symbols and will not be described. A backlight device 330 according to the present embodiment includes a prism sheet 350 (a light source-side prism sheet) between the prism sheet 50 and the reflection type polarizing plate 40. The prism sheet 350 includes a sheet base member 351 of a sheet-shape and prism portions 352 (light source-side prism portions) formed on the front side of the sheet base member 351. The prism portions 352 extend in the X-axis direction and are arranged in the long-side direction (the Y-axis direction) of the sheet base member 351. Namely, the arrangement direction of the prism portions 352 is perpendicular to the arrangement direction of the prism portions 52 of the prism sheet 50. The prism portion 352 does not have a light reflecting portion.

The light rays that has passed through the reflection type polarizing plate 40 are collected with respect to the Y-axis direction by the prism sheet 350, and the front brightness of the backlight device 330 is further improved. If the light guide plate 33, the prism sheet 50, and the prism sheet 350 are stacked in this order, the light that is reflected by the prism sheet 350 toward the light guide plate 33 is reflected by the light reflecting portion 53 of the prism portion 52 toward the prism sheet 350 and the light may exit in the undesired light exit direction (the first direction) in which the light exiting is to be restricted by the light reflecting portion 53. However, accordingly to the configuration of the present embodiment, the light guide plate 33, the prism sheet 350, and the prism sheet 50 are stacked in this order and therefore, the exit direction of light rays is surely restricted by the light reflecting portion 53.

Figure 13:
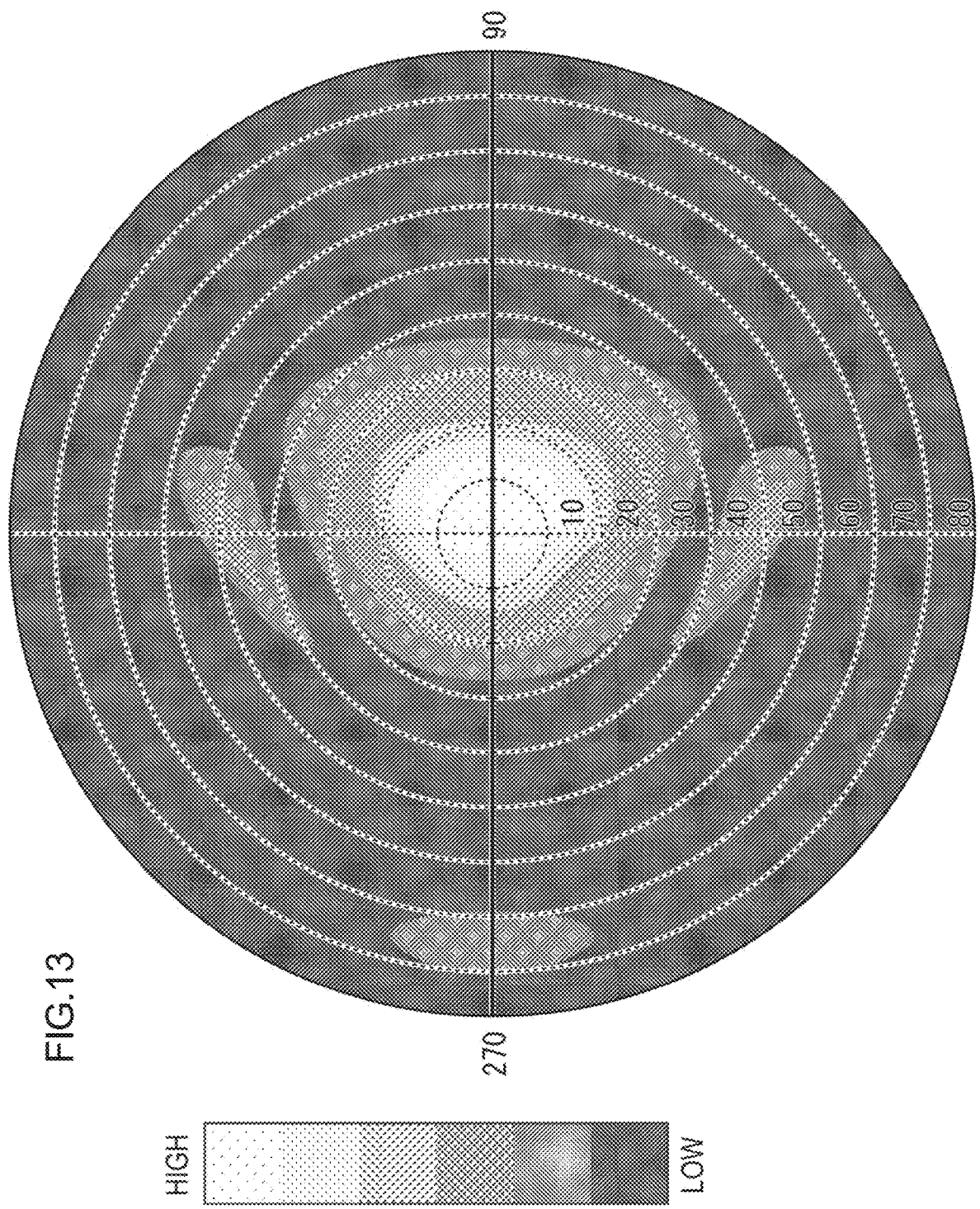
FIG. 13 is a diagram illustrating a brightness angle distribution according to the third embodiment.
Figure 14:
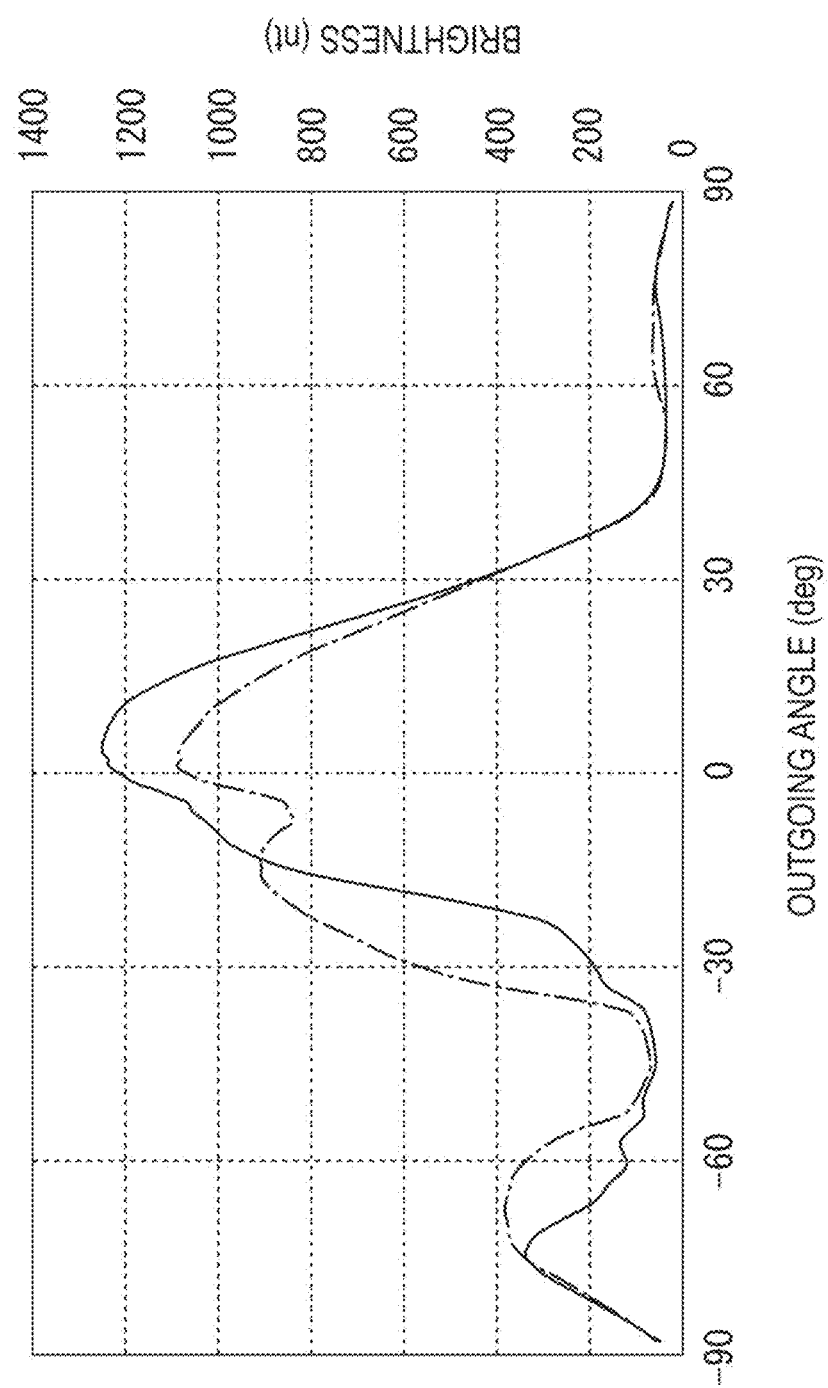
FIG. 14 is a graph illustrating a brightness angle distribution according to the third embodiment.
Figure 15:
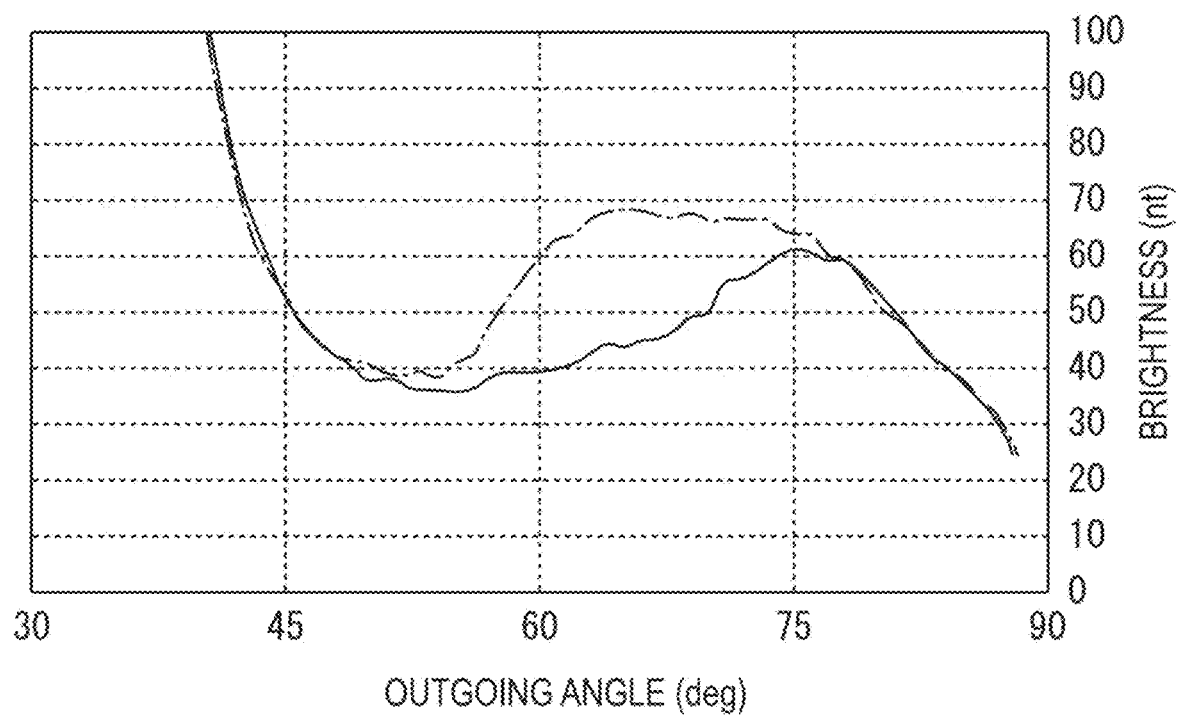
FIG. 15 is a graph illustrating a part of the graph in FIG. 14.

FIG. 13 is a diagram illustrating a brightness angle distribution according to the present embodiment. According to the diagram in FIG. 13, in the present embodiment, compared to the configuration of the first embodiment (see FIG. 4), the light is likely to be collected in the Y-axis direction (the vertical axis in FIG. 13). FIG. 14 is a graph illustrating relation of the outgoing angles (the lateral axis) and the brightness (the vertical axis). FIG. 15 is a graph illustrating the range of the outgoing angles from 30° to 90° in FIG. 14. In FIGS. 14 and 15, sold lines illustrate brightness of the backlight device 330 of the third embodiment and dashed lines illustrate brightness of the backlight device 30 of the first embodiment. As illustrated in FIGS. 14 and 15, in the present embodiment, compared to the first embodiment, the brightness of light rays exiting the prism portion 52 in a direction toward the light reflecting portion 53 (the right side) is lower (refer the range of the outgoing angles from 45° to 75°). Accordingly, in the present embodiment, the exit direction of light rays is surely restricted by the light reflecting portion 53.

Fourth Embodiment

Next, a fourth embodiment of the present technology will be described with reference to FIGS. 16 to 19. Same components as those of the above embodiments are provided with same symbols and will not be described. A backlight device 430 according to the present embodiment includes a prism sheet 450 (a light source-side prism sheet) between the reflection type polarizing plate 40 and the light guide plate 33. The prism sheet 450 includes a sheet base member 451 of a sheet-shape and prism portions 452 (light source-side prism portions) formed on the front side of the sheet base member 451. The prism portions 452 are arranged in the long-side direction (the Y-axis direction) of the sheet base member 451. The sheet base member 51 and the prism portions 52 of the prism sheet 50 are formed by molding transparent synthetic resin such as polycarbonate with extrusion molding and are formed integrally from the same material. The sheet base member 451 and the prism portions 452 of the prism sheet 450 are independent components. For example, the sheet base member 451 is made of thermoplastic resin such as PET and the prism portions 452 are made of ultraviolet curing resin.

PET generally has a large double refraction property. Therefore, if the sheet base member 51 of the prism sheet 50 is made of PET, the linearly polarized light that has passed through the reflection type polarizing plate 40 may be cancelled. Therefore, it is preferable to form the prism sheet 50 disposed on the light exit side with respect to the reflection type polarizing plate 40 by molding transparent synthetic resin such as polycarbonate with extrusion molding to restrict the double refraction. It may not be required greatly to restrict occurrence of the double refraction in the prism sheet 450 disposed between the reflection type polarizing plate 40 and the light guide plate 33, since the light that has passed through the prism sheet 450 travels toward the reflection type polarizing plate 40. Therefore, material cost can be reduced by using PET for the sheet base member 451 of the prism sheet 450.

Figure 17:
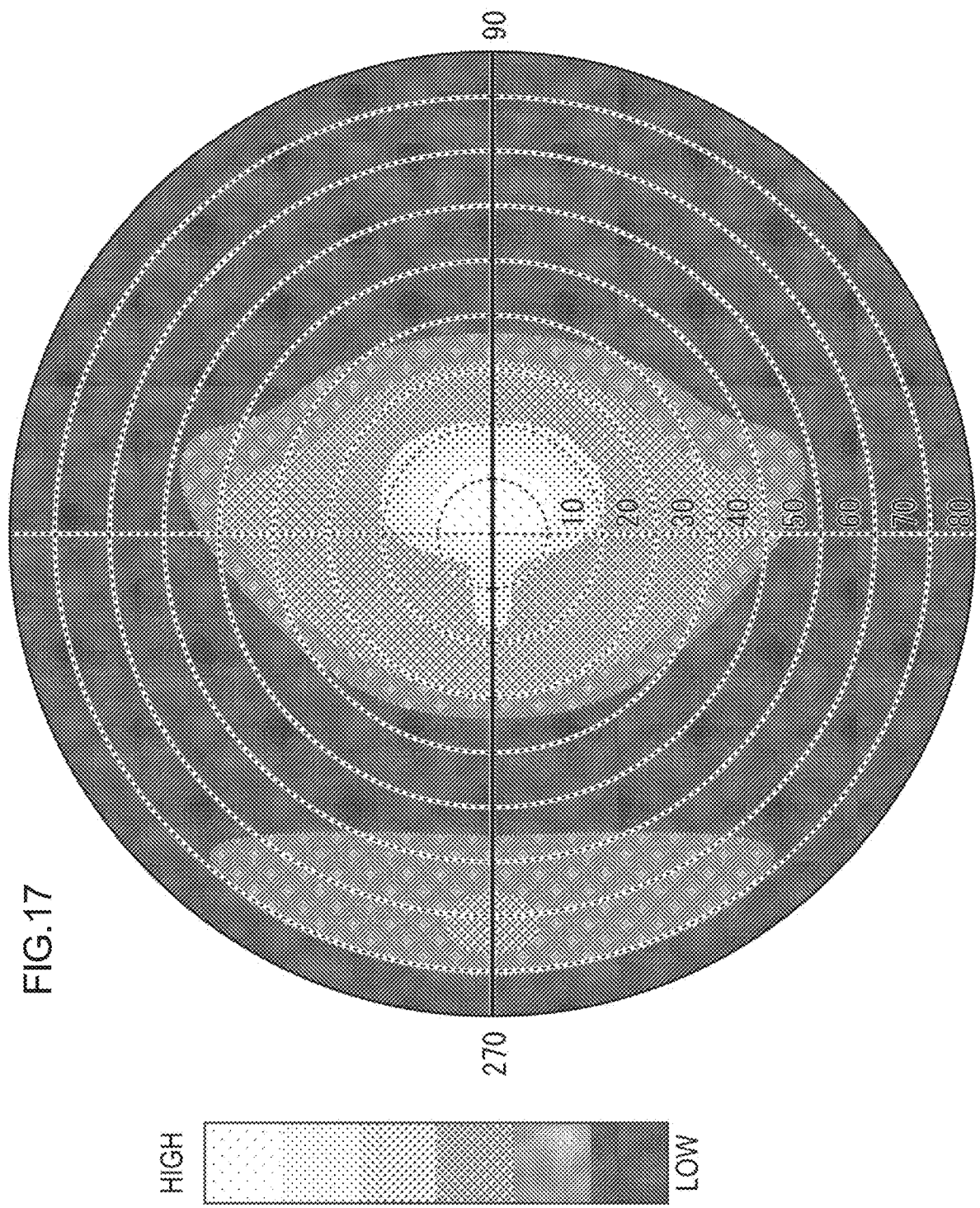
FIG. 17 is a diagram illustrating a brightness angle distribution according to the fourth embodiment.
Figure 18:
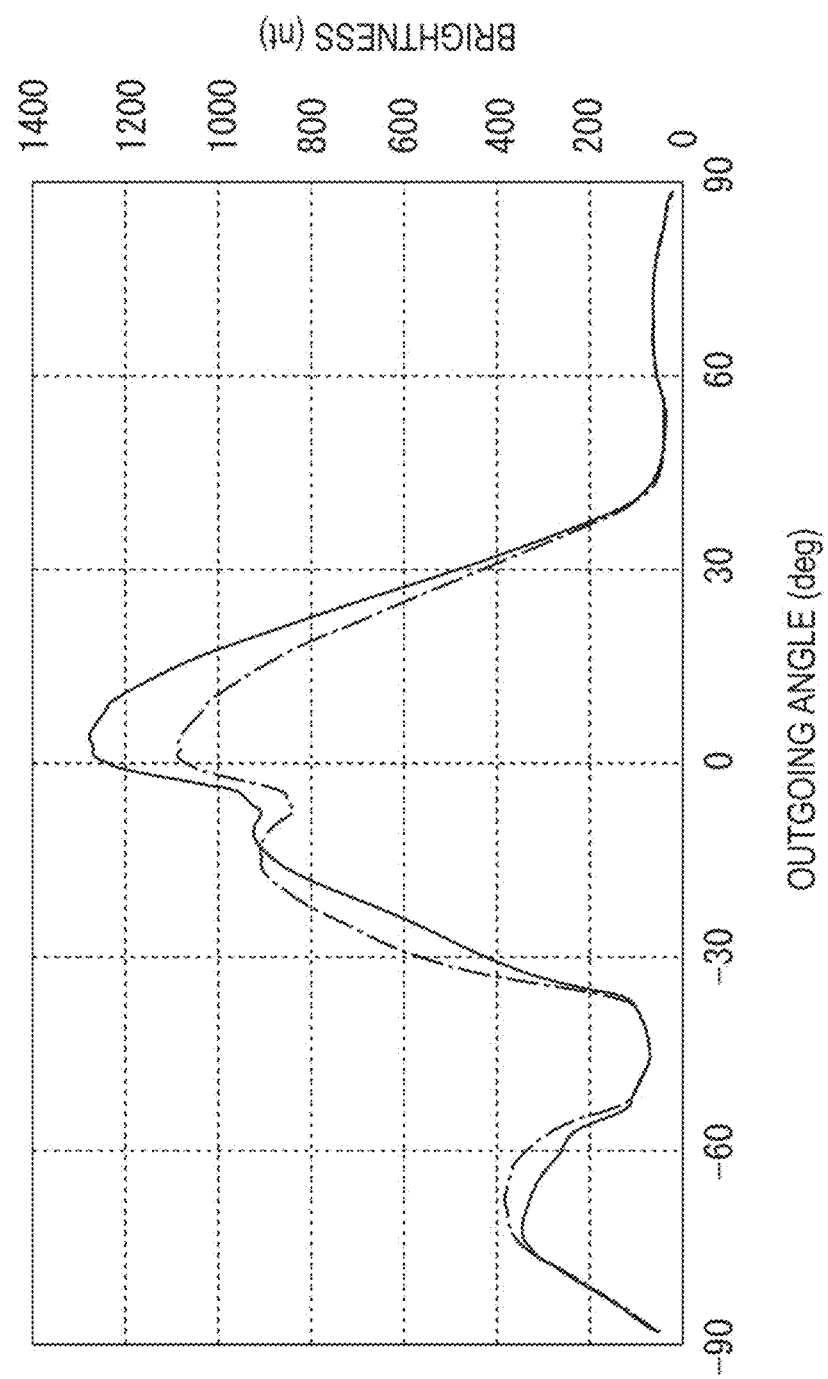
FIG. 18 is a graph illustrating a brightness angle distribution according to the fourth embodiment.
Figure 19:
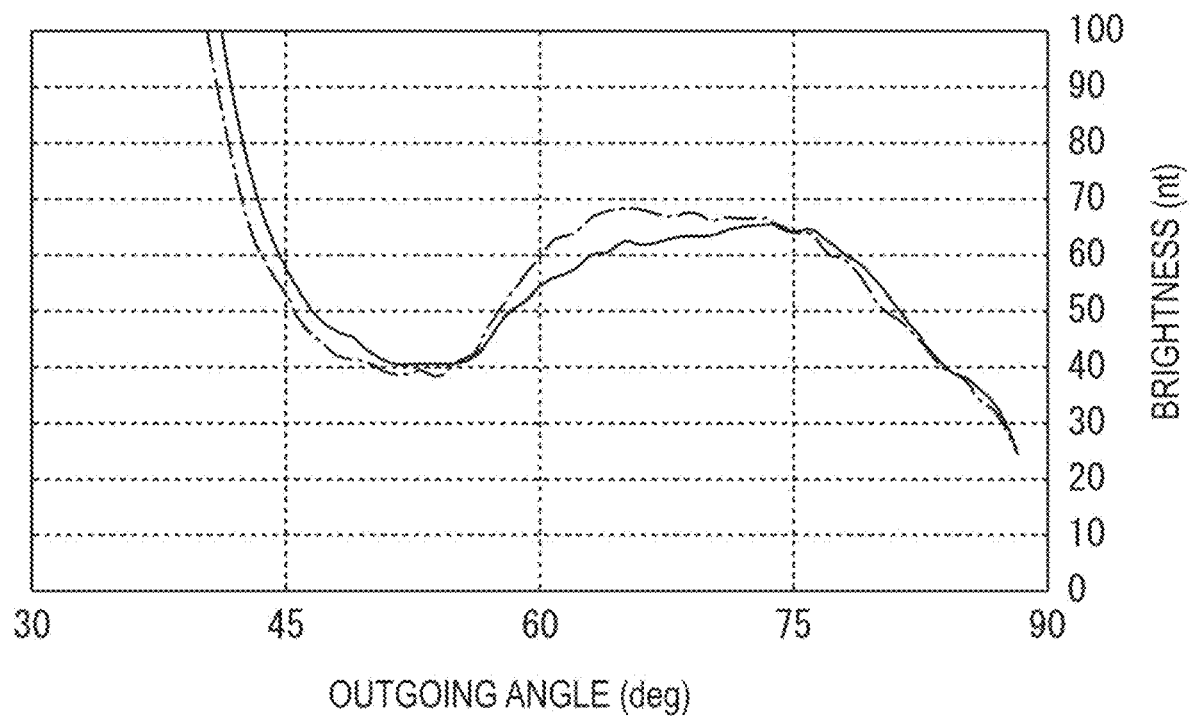
FIG. 19 is a graph illustrating a part of the graph in FIG. 18.

FIG. 17 is a diagram illustrating a brightness angle distribution according to the present embodiment. According to the diagram in FIG. 17, in the present embodiment, compared to the configuration of the first embodiment (see FIG. 4), the light is likely to be collected in the Y-axis direction. FIG. 18 is a graph illustrating relation of the outgoing angles and the brightness. FIG. 19 is a graph illustrating the range of the outgoing angles from 30° to 90° in FIG. 18. In FIGS. 18 and 19, solid lines illustrate brightness of the fourth embodiment and dashed lines illustrate brightness of the first embodiment. As illustrated in FIGS. 18 and 19, in the present embodiment, compared to the first embodiment, the brightness of light rays exiting the prism portion 52 in a direction toward the light reflecting portion 53 (the right side) is lower (refer the range of the outgoing angles from 60° to 75° in FIG. 19). Accordingly, in the present embodiment, the exit direction of light rays is surely restricted by the light reflecting portion 53.

Other Embodiments

The technology described herein is not limited to the embodiments described above with reference to the drawings. The following embodiments may be included in the technical scope.

(1) The optical member may be any component as long as it applies an optical action to the light from the light guide plate and may be a light diffuser sheet.

(2) The present technology may be applied to a direct-type backlight device including only LEDs as the light source.

(3) The light reflecting portion 53 may be necessarily disposed on at least a part of the prism portion 52. For example, the light reflecting portion 53 may be disposed on the sloped surface 54 (the sloped surface closer to the LEDs 31). The prism portions 52 may be arranged in a direction (the Y-axis direction) perpendicular to the arrangement direction of the LEDs 31 and the light guide plate 33 (the X-axis direction). The LEDs 31 may be arranged opposite two or more side edges of the light guide plate 33.

The invention claimed is:

1. A lighting device comprising:
a light source having a light exit surface;
a reflection type polarizing plate disposed on the light exit surface of the light source and applying an optical action to light exiting the light source; and
a prism sheet disposed on the reflection type polarizing plate while having the reflection type polarizing plate between the prism sheet and the light source, the prism sheet including prism portions and a light reflecting portion that is disposed on a part of a surface of the prism portions opposite from the reflection type polarizing plate and is configured to reflect and not to transmit light rays that have travelled through the reflection type polarizing plate and travelled within the prism portions and reached the light reflecting portion.

2. The lighting device according to claim 1, wherein the prism portions are arranged in an arrangement direction that matches a polarization axis of linearly polarized light passing through the reflection type polarizing plate.

3. The lighting device according to claim 1, wherein the prism portions are arranged in an arrangement direction that is perpendicular to a polarizing axis of linearly polarized light passing through the reflection type polarizing plate.

4. The lighting device according to claim 1, further comprising a light source-side prism sheet disposed between the prism sheet and the light source and including light source-side prism portions arranged in a direction that is different from an arrangement direction in which the prism portions of the prism sheet are arranged.

5. The lighting device according to claim 1, wherein
each of the prism portions has a triangular columnar shape having a first sloped surface and a second sloped surface, and
the light reflecting portion covers one of the first sloped surface and the second sloped surface.

6. The lighting device according to claim 5, wherein
the light source includes a light guide plate having the light exit surface and a point light source disposed opposite an edge surface of the light guide plate and exiting light toward the edge surface,
the prism portions extend parallel to the edge surface of the light guide plate and are arranged in an arrangement direction that matches an arrangement direction in which the point light source and the light guide plate are arranged and the second sloped surface is farther from the point light source than the first sloped surface is, and
the light reflecting portion is disposed to cover the second sloped surface.

7. A display device comprising:
the lighting device according to claim 1; and
a display panel displaying images using light from the lighting device.

8. The display device according to claim 7, further comprising an anti-reflection layer or an anti-glare layer on a surface of the display panel opposite the lighting device.

9. The display device according to claim 7, wherein
the display panel is a liquid crystal panel,
the display panel includes a pair of substrates that are opposite each other, a liquid crystal layer disposed between the pair of substrates, and a circular polarizing plate covering one of the substrates disposed opposite the lighting device from the lighting device side.

10. The lighting device according to claim 1, wherein
the reflection type polarizing plate is configured to transmit linearly polarized light having a specific direction of the oscillation and reflect linearly polarized light having a direction of the oscillation perpendicular to the specific direction.

* * * * *